[11] Patent Number: 5,074,503
[45] Date of Patent: Dec. 24, 1991

[54] STORAGE APPARATUS FOR USE WITH MOTOR VEHICLES

[75] Inventors: Carl R. McDonald, 66 Duncan St., Maronbra, Australia, 2035; Ronald G. Hinkley, St. Ives; Brian Rollston, Barlinain, both of Australia

[73] Assignee: Carl R. McDonald, Australia

[21] Appl. No.: 478,010

[22] PCT Filed: Nov. 2, 1988

[86] PCT No.: PCT/AU88/00426

§ 371 Date: May 3, 1990

§ 102(e) Date: May 3, 1990

[87] PCT Pub. No.: WO89/04267

PCT Pub. Date: May 18, 1989

[30] Foreign Application Priority Data

Nov. 5, 1987 [AU] Australia ................................ PI5260

[51] Int. Cl.5 ............................................. F16M 11/38
[52] U.S. Cl. ................................. 248/167; 248/188.5; 248/188.6
[58] Field of Search ..................... 248/163.1, 166, 167, 248/168, 170, 173, 440, 188.5, 188.6; 211/195; 280/79.3, 32.5; 212/142.1; 72/483, 705

[56] References Cited

U.S. PATENT DOCUMENTS

| | | | |
|---|---|---|---|
| 3,110,404 | 11/1963 | De Stasi | 212/142.1 X |
| 3,214,959 | 11/1965 | Bowden | 212/142.1 X |
| 4,010,922 | 3/1977 | Heller et al. | 248/170 X |
| 4,108,411 | 8/1978 | Spratt et al. | 248/166 X |
| 4,609,174 | 9/1986 | Nakatani | 248/168 X |
| 4,640,482 | 2/1987 | Rogers | 248/168 |
| 4,895,382 | 1/1990 | Anderson | 280/79.3 X |

FOREIGN PATENT DOCUMENTS

| | | |
|---|---|---|
| 60-42145 | 3/1985 | Japan . |
| 2005604A | 4/1979 | United Kingdom . |

*Primary Examiner*—Ramon O. Ramirez
*Attorney, Agent, or Firm*—Majestic, Parsons, Siebert & Hsue

[57] ABSTRACT

A storage apparatus for use in motor vehicle repair and maintenance takes the form of a foldable tablelike structure which houses the vehicle underneath its top surface with its legs on either side of the vehicle. The legs being foldable when the apparatus is not in use to provide a collapsed or relatively flat arrangement which can be efficiently stored in minimum storage space when not in use.

13 Claims, 4 Drawing Sheets

STORAGE APPARATUS FOR USE WITH MOTOR VEHICLES

The present invention relates to an apparatus suitable for the storage of panels, parts and fittings of a motor vehicle.

The invention has special utility for users such as motor vehicle body builders, mechanics and spray painters who are called upon to remove and replace motor vehicle panels, parts and fittings.

It is clearly desirable that all removed parts be kept in close association with the vehicle from which they have been removed. Loss or disassociation of such removed parts has been a constant problem and it has been estimated that relevant businesses incur a significant cost each year in the replacement of lost items.

Ad hoc practices have developed in order to maintain association between a vehicle and its parts. Typically, removed parts have been placed within the vehicle itself however this practice receives disapproval from vehicle owners who fear contamination of or damage to the vehicle interior.

Other solutions have entailed the use of storage "bins" however it has been shown that the risk of loss or confusion of parts is only marginally decreased.

Finally, it has been recognised that it is desirable to keep larger vehicle body parts such as boots, bonnets and doors off the ground and away from working areas.

It is an object of the present invention to provide a simple and convenient storage apparatus which overcomes these disadvantages.

Accordingly the present invention provides a storage apparatus for temporary storage of parts removed from a motor vehicle, said apparatus comprising a horizontal frame atop a plurality of legs supported on ground engaging wheels, said horizontal frame constituting a storage area for said parts, the height and spacing of the legs being such as to enable the apparatus to be wheeled into a position in which the storage area of the apparatus overlies the vehicle.

In order that the nature of the invention may be better understood a preferred form thereof is described hereunder with reference to the accompanying drawings in which.

Figure 1:
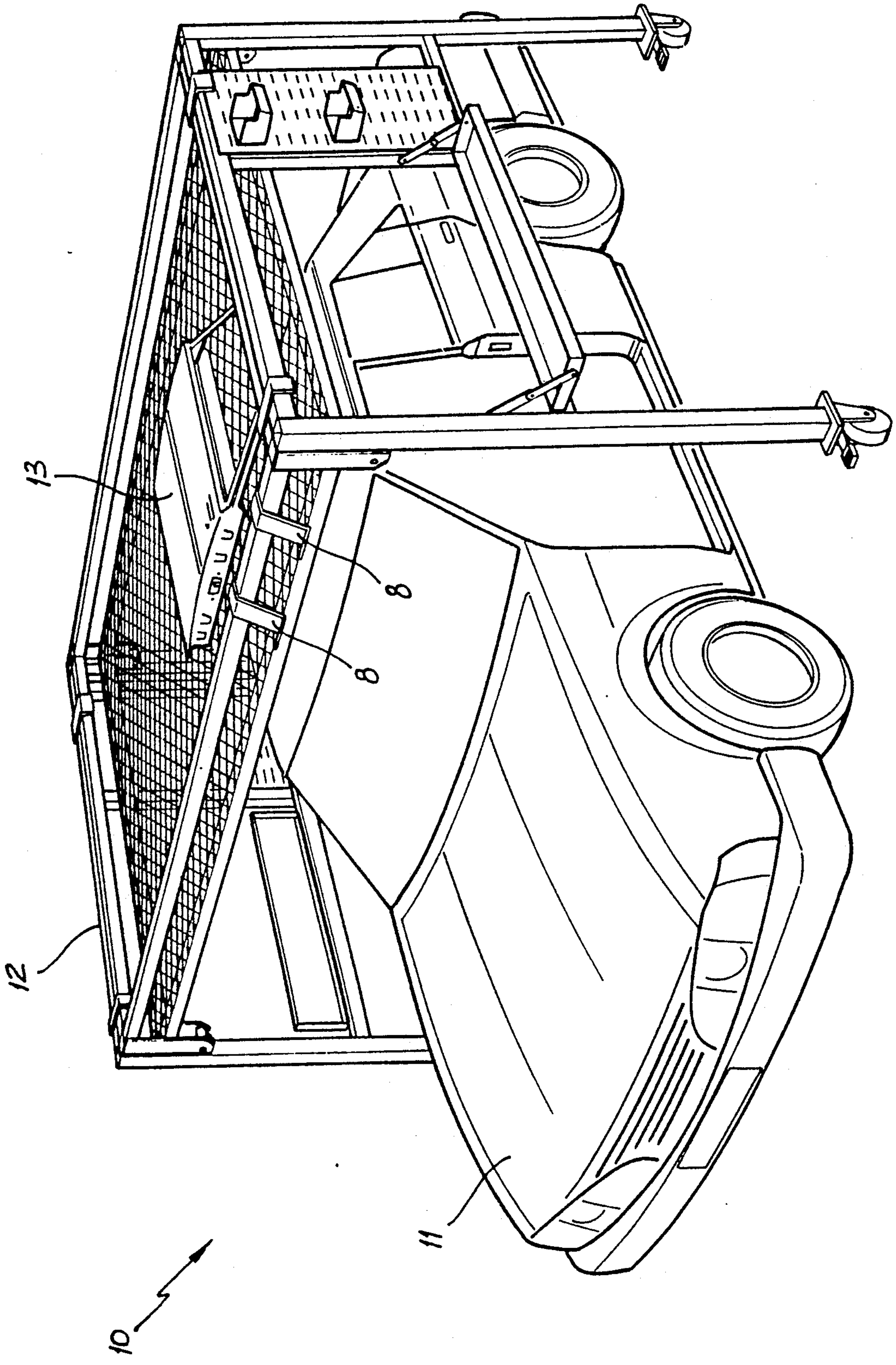
FIG. 1 illustrates an embodiment of the present invention in use.

In FIG. 1 there is shown generally at 10 a motor vehicle 11 upon which work is being done. The storage apparatus 12 sits over at least a portion of the vehicle 11. In FIG. 1 a vehicle door 13 has been removed from the vehicle 11 and now rests upon storage apparatus 12. An alternative storage location could be for the door 13 to be hung from removable hooks 8 located on a side of apparatus 12.

Figure 2:
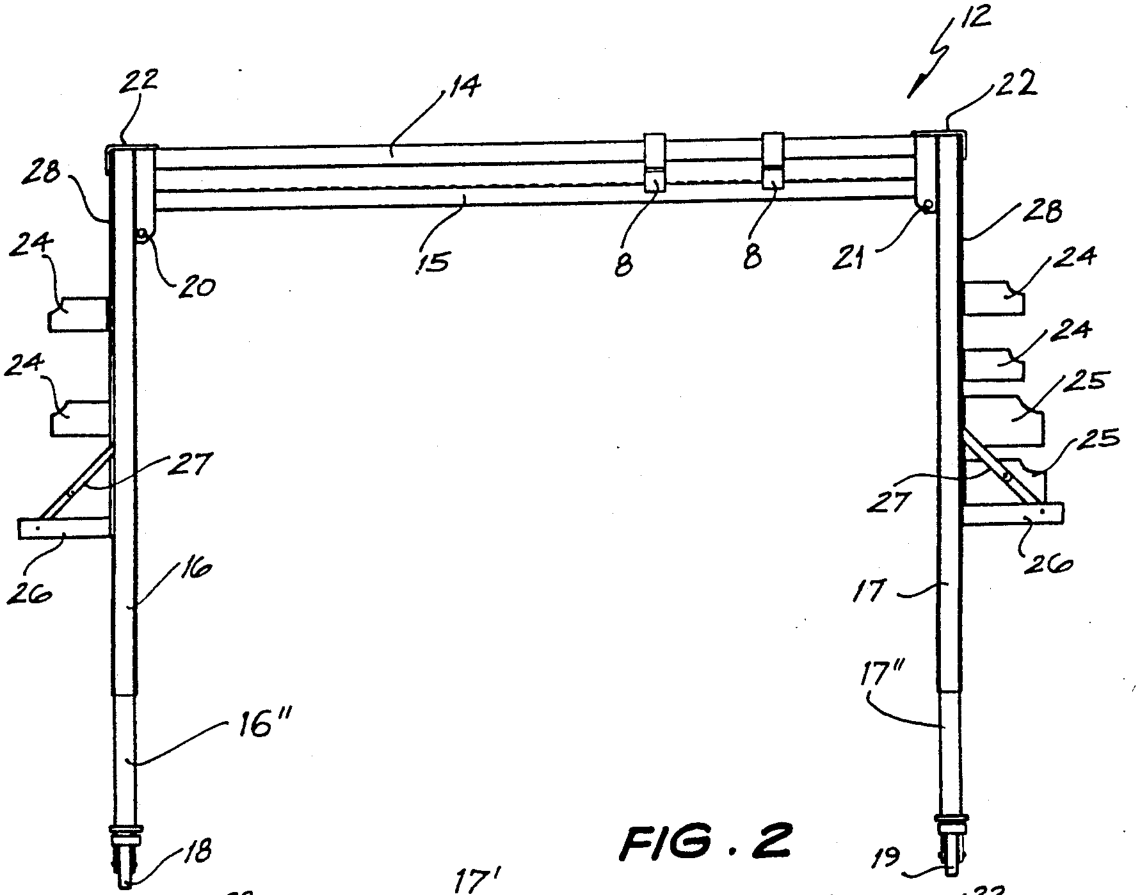
FIG. 2 is a front perspective of the embodiment of the invention shown in FIG. 1.
Figure 7A:
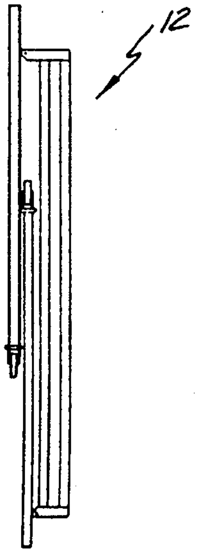
FIGS. 7A-7D are perspective views showing the sequence of erection of the storage apparatus embodiment of the invention.
Figure 7B:
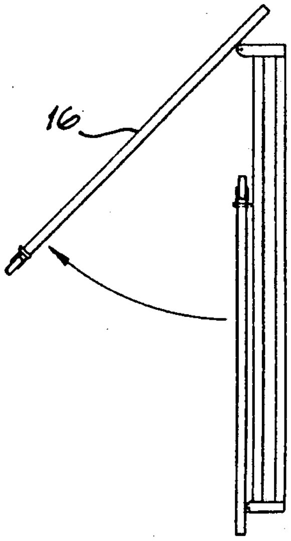
Figure 7C:
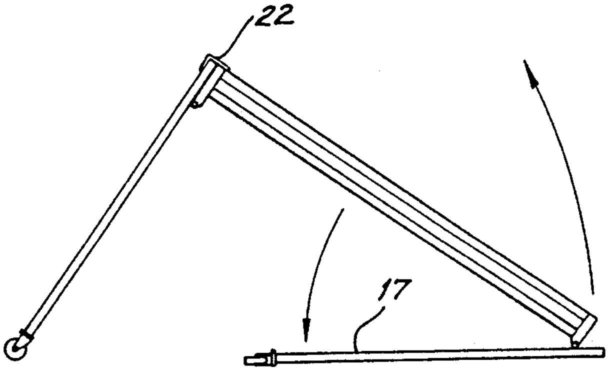
Figure 7D:
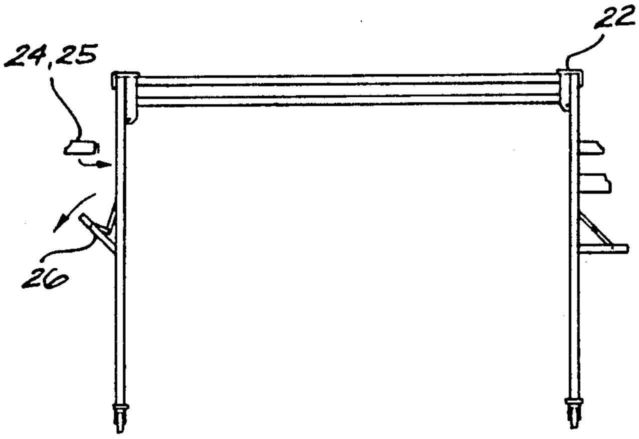

In FIG. 2 the storage apparatus 12 is shown in greater detail. A pair of transverse members 14,15 define one of four side walls to a planar storage surface lying in the plane of member 15. Two front legs 16,17 are hingedly connected to members 14,15 and are provided at their terminal ends with wheels 18,19. In this preferred form of the invention members 14,15 and legs 16,17 and other similar members and legs are made from 50 mm square aluminium. The wheels 18,19 and similar wheels are 125 mm × 36 mm. Hinges 20,21 allow legs 16,17 to be folded to a position substantially parallel with members 14,15 for compaction (see FIG. 7A). Hinges 20,21 are offset such that leg 17 is first folded into said parallel position, and subsequently leg 16 is folded into said parallel position overlying leg 17.

When the legs 16,17 are in the open extended position as shown in FIG. 2, locking clamps 22 are clipped over members 14,16′ and 14,17′ so as to maintain the legs in their extended position and prevent inadvertent collapse.

Figure 3:
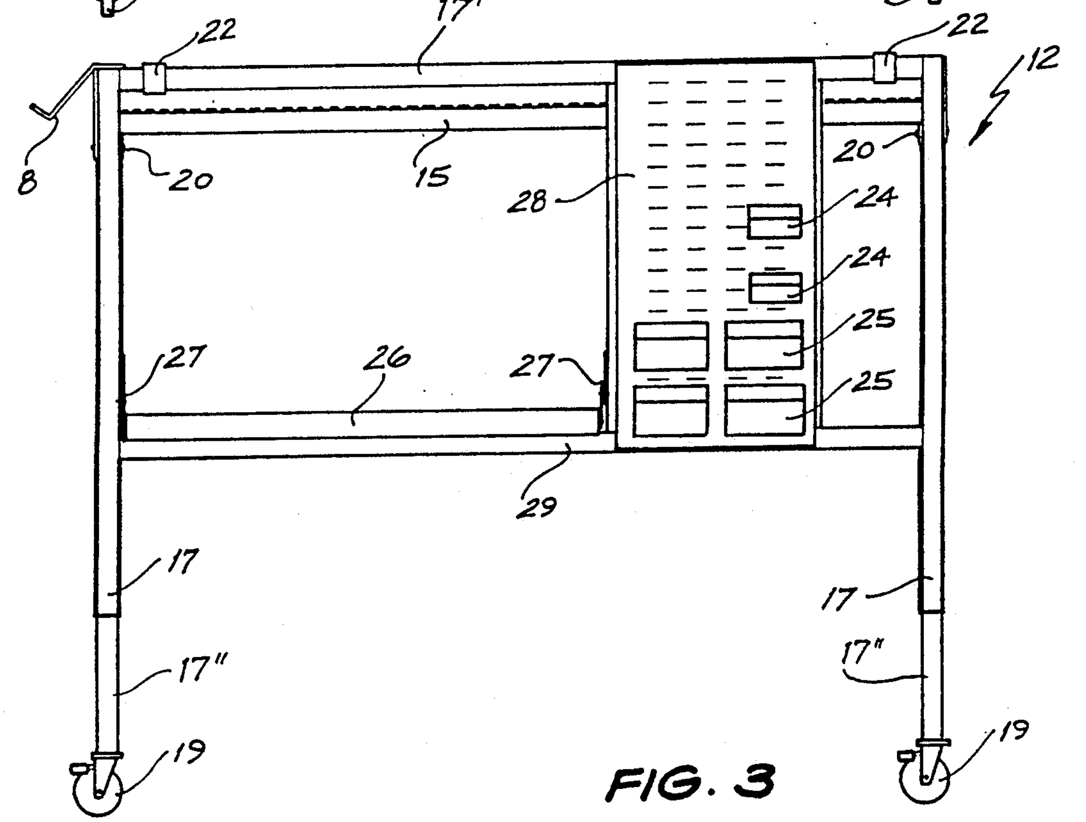
FIG. 3 is a side elevation of the embodiment of the invention shown in FIG. 1.

As shown in FIGS. 2 and 3, legs 16 and 17 comprise telescoping portions 16″ and 17″ which permit the height of the storage apparatus to be adjusted in accordance with the height of a vehicle to be positioned beneath members 15.

Buckets 24,25 for containing removed parts are attached to the storage apparatus 12. In this embodiment buckets 24,25 are removably attached to backing sheet 28 shown in FIG. 3. In FIG. 3 there is also shown an additional horizontal bracing member 29 which provides structural rigidity between pairs of legs.

Figure 4:
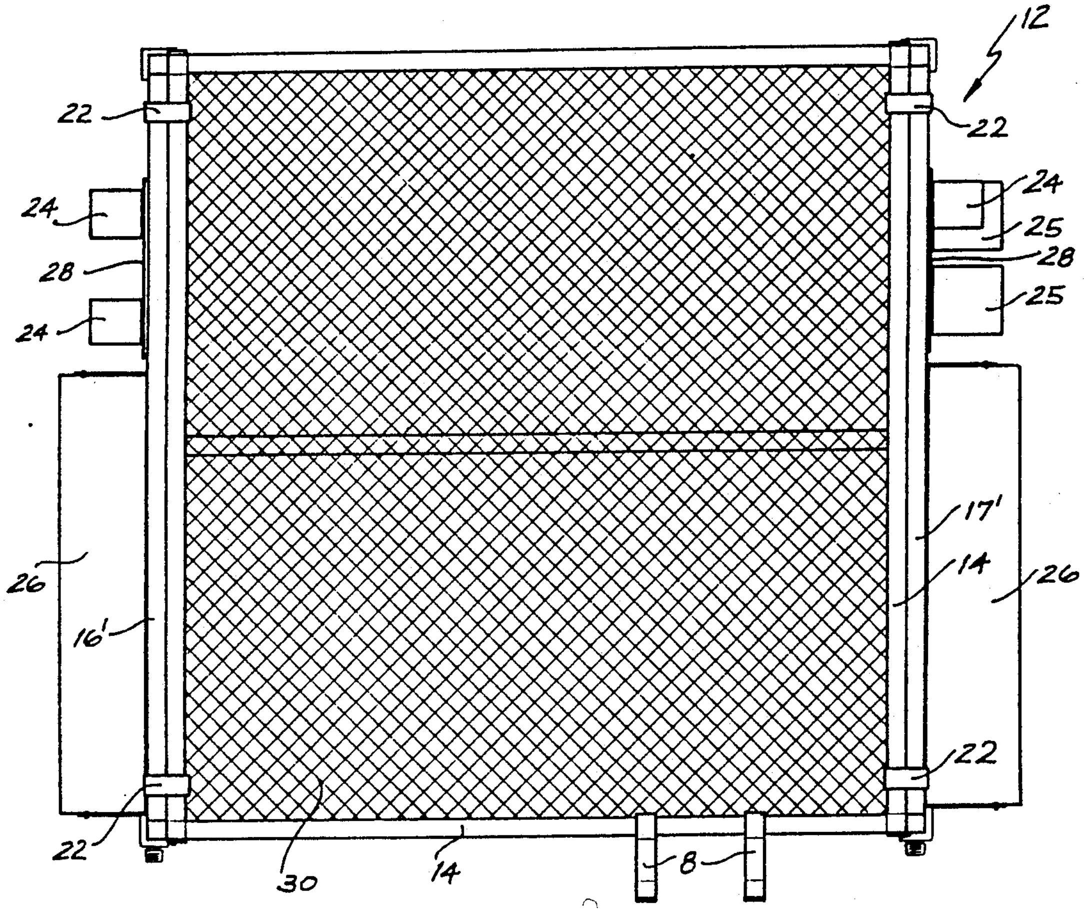
FIG. 4 is a view of the embodiment of the invention shown in FIG. 1.

FIG. 4 shows a section of metallic mesh 30 which constitutes the planar horizontal storage surface circumscribed by members 15.

Figure 5:
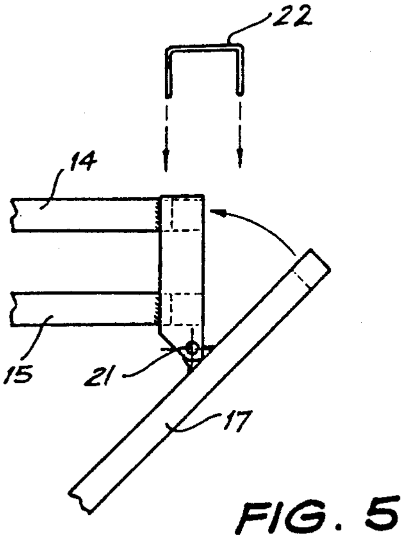
FIG. 5 is a larger scale view showing the detail of a hinge and locking system 21 and 23 other than that of FIG. 2.
Figure 6:
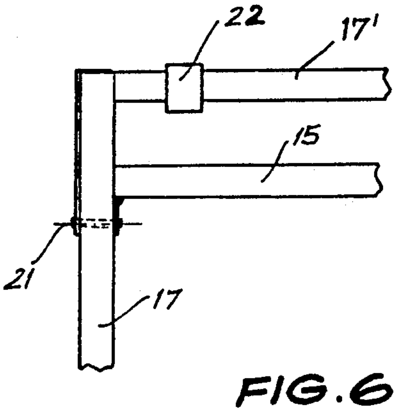
FIG. 6 is the view VI—VI of FIG. 5.

In FIGS. 5 and 6 leg 17 is shown in its half opened or folded position as hinged at 21 with an inverted U-shaped locking clip 22 to be engaged over members 14 and 17 when leg 17 is vertical.

As shown in FIG. 2 a hingedly mounted cantilevered bench or shelf 26 is attached to side bracing member 29. Such a shelf can be moved to its horizontal position projecting laterally from member 29 so as to hold work tools or parts as they are removed from or replaced on vehicle 11.

A further embodiment incorporates telescoping legs (not shown) 16, 17 which enable the apparatus 12 to be adjusted to a range of heights to accommodate different height vehicles.

We claim:

1. A storage apparatus for temporary storage of parts removed from a motor vehicle, said apparatus comprising a horizontal frame atop a plurality of telescopically adjustable legs supported on ground engaging wheels, said horizontal frame constituting a storage area for said parts, the height and spacing of the legs being such as to enable the apparatus to be wheeled into a position in which the storage area of the apparatus overlies the vehicle.

2. An apparatus as claimed in claim 1 comprising two pairs of legs, each pair of legs being hinged connected to an opposite side of said frame and foldable relative to said frame to lie in planes which are substantially parallel to the plane of the frame.

3. An apparatus as claimed in claim 1 or 2 wherein the legs are lockable in extended position by means of a substantially U-shaped clip.

4. An apparatus as claimed in claim 1 or 2 wherein the storage area of said frame comprises an open-pored mesh.

5. An apparatus as claimed in claim 1 or 2 wherein at least one pair of said ground engaging wheels are braked castering wheels.

6. An apparatus as claimed in claim 1 or 2 comprising at least one hingedly mounted shelf adapted to be positioned horizontally when said legs are extended.

7. An apparatus as claimed in claim 1 or 2 comprising an attachment surface for removable storage bins.

8. A storage apparatus for temporary storage of parts removed from a motor vehicle, said apparatus comprising a horizontal frame atop two pairs of legs supported on ground engaging wheels, said horizontal frame constituting a storage area for said parts, the height and spacing of the legs being such as to enable the apparatus to be wheeled into a position in which the storage area of the apparatus overlies the vehicle, each pair of legs being hingedly connected to an opposite side of said frame and foldable relative to said frame to lie in planes which are substantially parallel to the plane of the frame.

9. An apparatus as claimed in claim 8 wherein the legs are lockable in extended position by means of a substantially U-shaped clip.

10. An apparatus as claimed in claim 8 or 9 wherein the storage area of said frame comprises an open-pored mesh.

11. An apparatus as claimed in claim 8 or 9 wherein at least one pair of said ground engaging wheels are braked castering wheels.

12. An apparatus as claimed in claim 8 or 9 comprising at least one hingedly mounted shelf adapted to be positioned horizontally when said legs are extended.

13. An apparatus as claimed in claim 8 or 9 comprising an attachment surface for removable storage bins.

* * * * *

UNITED STATES PATENT AND TRADEMARK OFFICE
CERTIFICATE OF CORRECTION

PATENT NO. : 5,074,503

DATED : December 24, 1991

INVENTOR(S) : Carl R. McDonald, Ronald G. Hinkley, Brian Rollston

It is certified that error appears in the above-identified patent and that said Letters Patent is hereby corrected as shown below:

Column 2, line 62, in Claim 2: replace "hinged" with --hingedly--

Signed and Sealed this

Twenty-third Day of March, 1993

*Attest:*

STEPHEN G. KUNIN

*Attesting Officer* *Acting Commissioner of Patents and Trademarks*